(No Model.)
J. E. WARREN.
FILTER.
No. 332,979. Patented Dec. 22, 1885.
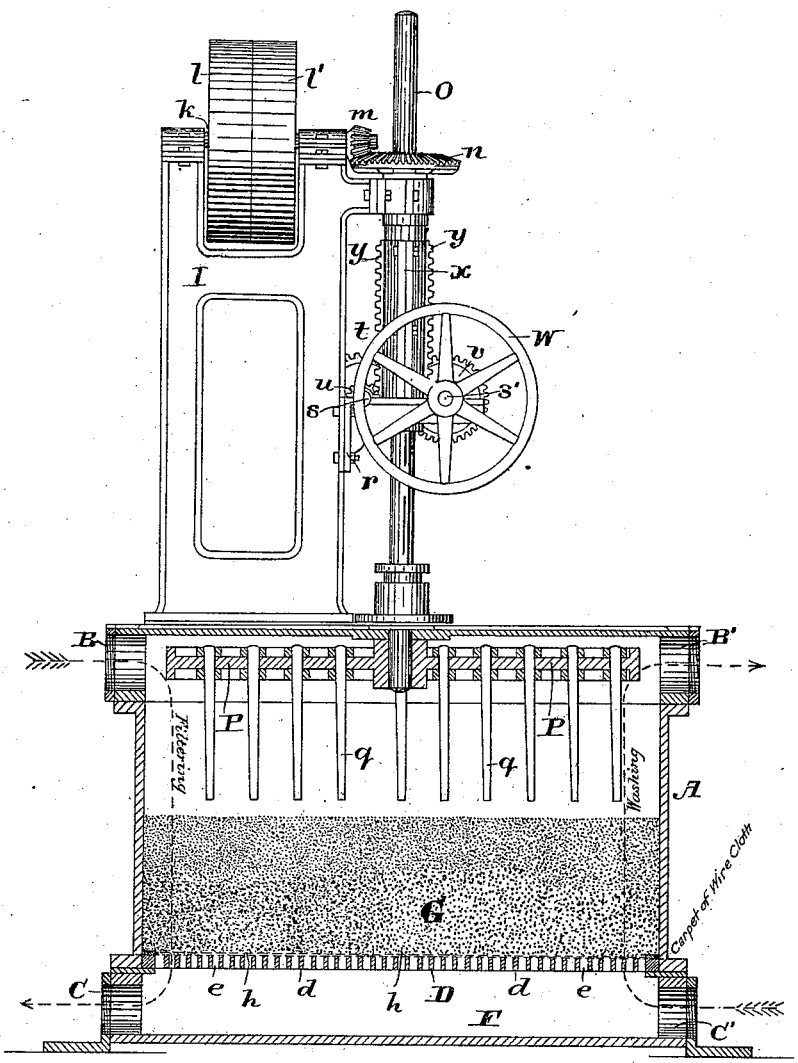
Witnesses
J. Henry Kaiser
Wm. A. Barnes
Inventor
John E. Warren
By Herbert G. Briggs
Attorney

UNITED STATES PATENT OFFICE.

JOHN E. WARREN, OF WESTBROOK, MAINE.

FILTER.

SPECIFICATION forming part of Letters Patent No. 332,979, dated December 22, 1885.

Application filed February 20, 1885. Serial No. 156,539. (No model.)

*To all whom it may concern:*

Be it known that I, JOHN E. WARREN, residing in Westbrook, in the county of Cumberland and State of Maine, have invented certain new and useful Improvements in Filters; and I do hereby declare that the following is a full, clear, and exact description of the invention, which will enable others skilled in the art to which it appertains to make and use the same.

The object of this invention is to furnish a new and improved water-filter for the use of mills, dwelling-houses, &c., provided with certain novel and ingenious mechanical combinations and arrangements, whereby the filtering agents used can be readily and thoroughly cleansed and made free from dirt, filth, and foreign matter which has accumulated in the filter-bed during the process of filtration.

To accomplish the object of the invention my improved water-filter consists in the details of construction, combination, and arrangement of parts, as hereinafter more fully pointed out.

My invention is embodied in the mechanism illustrated in the accompanying drawing, which is a side elevation of my apparatus, partly in section, in order to show the interior of the tank and its agitating or stirring mechanism.

In the drawing, A designates an upright cylindrical cistern or tank, which may be of any desired capacity. The tank may have a closed or open top. Near its top the tank A has ports B B', by means of which water or other fluid to be filtered enters the tank. At the bottom of the tank C C' indicate ports for carrying off filtered liquids.

A false bottom or screen, D, is placed at a convenient distance from the floor of the tank. This false bottom is composed of a number of strips or slats, $d$ $d$ $d$, placed parallel to each other, but somewhat separated, leaving spaces $e$ $e$ $e$, which permit the free passage of water and the like into the chamber F, after percolating through a bed of filtering agents resting above the false bottom.

G shows a bed of filtering agents.

For filtering agents I use any of the well-known and commonly-employed materials—such as gravel, sand, bone, charcoal, &c. As above stated, the filter-bed G rests upon the false bottom D. To prevent the particles of which the filter-bed is composed from falling through the spaces $e$ $e$, a carpet of wire-netting or perforated metal sheets is drawn over the false bottom before the filter-bed is placed in position.

$h$ shows the carpet.

In operating the filter the liquids to be treated are fed into the tank A through one or both of the ports B B', and rests above the filter-bed G. It then passes downward through the filter-bed, leaving its sediment and impurities behind, and in a perfectly-clear condition is drawn from the chamber F by the ports C C'.

The continuous percolation of fluids through the filter-bed G soon causes the bed to become foul, by reason of the quantity of sediment taken up and retained. To remove and carry off this accumulation of sediment without taking the filter-bed from the tank is one of the chief features of my invention. To do this I have devised a mechanical appliance for stirring up and agitating the filter-bed, so that the grains of which it is composed may be cleansed of sediment.

At one side of the tank A is affixed an upright or supporting frame, I. Journaled in a recess at the top of the frame I is seen a short shaft, $k$, which carries a fast pulley, $l$, and a loose pulley, $l'$. On one end the shaft $k$ has a bevel-gear, $m$, which meshes with a bevel-gear, $n$. The gear $n$ is attached by a spline-connection to a vertical shaft or plunger, O, which revolves in proper bearings. At its lower end the shaft O is rigidly attached to a device, which I have denominated an "agitator." The agitator is composed of one or more horizontal cross-bars, P, provided on the under side with long teeth $q$ $q$ $q$. Instead of a cross-bar a wheel with spokes or a disk can be used for carrying the teeth $q$.

The mechanisms just described are used in rotating the agitator.

As it will be necessary at certain times to raise and lower the agitator, I have devised the following arrangement of parts: Brackets $r$ are set upon one side of the supporting-frame I. Journaled to the top sides of the brackets $r$ are shafts $s$ $s'$. On one end of shaft $s$ is set a gear-wheel, $t$. This shaft also carries a centrally-located pinion-wheel, $u$. The shaft $s'$ has a gear, $v$, to correspond with the gear $t$, and a pinion similar to $u$. The end of the shaft $s'$ carries a balance-pulley, W.

$x$ is a sleeve which surrounds the shaft O. Attached to the periphery of the sleeve are racks $y$ $y$, with which the pinions on the shafts $s$ and $s'$ engage.

The operation of the device is as follows: When it is necessary to cleanse the bed of filtering agents, the flow of liquid into the tank is cut off and the contained liquid is drawn off. A strong current of water is then forced into the tank at the bottom through one or both of the ports C C'. For the purposes of description it will be assumed that the water enters at C', and, following the course of the dotted arrow, ascends through the filter-bed G, rises toward the rim of the tank A, and passes off by way of the port B'. If deemed necessary, however, water can be forced in at both points C and C' and be drawn away at B and B'.

Forcing a current of water upwardly through the bed of filtering agents obviously constitutes a reversal of the usual process of filtration. The object of it is to loosen the pack of the filter-bed, while at the same time it tends to wash from it the sediment and foreign matter which have accumulated therein during filtration.

As soon as the current of water passing upwardly through the filter-bed is fully established, the agitator is lowered until the teeth $q$ are embedded in the top surface of the filter-bed. Power of any convenient kind is applied to the fast-pulley $l$. As this pulley rotates the gear $m$ is turned, and revolution is transmitted to the gear $n$. Thus, as the gear $n$ is attached to the shaft or plunger O, the agitator is revolved and the teeth $q$ whip the water and plow the surface of the filter-bed.

The parts for elevating and depressing the agitating mechanism are so constructed and arranged that the teeth $q$ can be gradually embedded in the filter-bed. Thus the position of the shaft O can be fixed in such manner that the teeth $q$ shall only scratch and plow the surface of the filter-bed; or the shaft O can be so depressed that the points of the teeth shall plow close to the carpet $h$, separating the filter-bed G from the false bottom D.

In practice it will generally be necessary to stir up the filter-bed at the surface only, because the sediment which accumulates during the process of filtration is nearly all deposited at or near the surface of the bed, clinging to the grains composing the bed. The action of the teeth $q$ is to whip the water and whirl it about at the same time that the surface of the bed is being plowed. Thus the grains of which the bed of filtering agents is composed will be rolled over each other, and the continual rubbing and impinging of the grains against each other will cause the sedimentary matter clinging to the grains to separate from them, when, as it is light, the sediment will be taken up by the current of water and pass off through the port B'. The whipping and agitation are continued till the water passing out of the port at the top becomes clear. The filter-bed is now found to be clean.

As soon as the bed is cleansed of its impurities the flow of the current of water into the bottom of the tank is stopped. The revolutions of the agitator are also stopped. In a short time the grains of the filter-bed will settle back into place and the filter is ready to take in water for filtration.

What I claim as my invention, and desire to secure by Letters Patent, is—

1. In a filtering apparatus, the combination, with the tank or cistern A, provided with the inlet-ports B B' and outlet-ports C C', of a false bottom or screen for supporting in place a bed of filtering agents, said false bottom or screen composed of parallel slats $d$ $d$, separated by spaces $e$ $e$, and covered with a carpet of wire-gauze or perforated sheet metal, $h$, and the toothed agitator vertically adjustable, substantially as herein described.

2. In a filtering apparatus, the herein-described agitating device, consisting of the cross-bar P and teeth $q$, which whip the water and plow into the bed of filtering agents G, for the purpose of freeing the same of adhering sediment, in combination with the plunger O, gears $n$ and $m$, and the means for giving rotation to said plunger O and its attached agitator, substantially as herein set forth.

In testimony that I claim the foregoing as my own I have affixed my signature in the presence of two witnesses.

JNO. E. WARREN.

Witnesses:
H. G. BRIGGS,
JOHN A. LIDLACK.